(12) United States Patent
Wainwright et al.

(10) Patent No.: US 7,684,904 B2
(45) Date of Patent: Mar. 23, 2010

(54) SYSTEMS AND METHODS FOR COMMUNICATION, NAVIGATION, SURVEILLANCE AND SENSOR SYSTEM INTEGRATION IN A VEHICLE

(75) Inventors: Calvin Wainwright, Macon, GA (US); Joe Farmer, Warner Robins, GA (US)

(73) Assignee: Arinc Incorporated, Annapolis, MD (US)

( * ) Notice: Subject to any disclaimer, the term of this patent is extended or adjusted under 35 U.S.C. 154(b) by 286 days.

(21) Appl. No.: 11/819,433

(22) Filed: Jun. 27, 2007

(65) Prior Publication Data

US 2009/0005916 A1   Jan. 1, 2009

(51) Int. Cl.
*G01C 23/00* (2006.01)
(52) U.S. Cl. .......................................... 701/3; 709/249
(58) Field of Classification Search ...................... 701/3; 709/224, 249; 725/73
See application file for complete search history.

(56) References Cited

U.S. PATENT DOCUMENTS

| | | | |
|---|---|---|---|
| 4,155,116 A | 5/1979 | Tawfik et al. | |
| 5,019,980 A | 5/1991 | Starr et al. | |
| 5,184,312 A | 2/1993 | Ellis | |
| 5,218,547 A | 6/1993 | Tebbs | |
| 5,229,538 A | 7/1993 | McGlynn et al. | |
| 5,377,109 A | 12/1994 | Baker et al. | |
| 5,541,863 A | 7/1996 | Magor et al. | |
| 5,581,462 A | 12/1996 | Rogers | |
| 5,828,897 A | 10/1998 | Kirsch et al. | |
| 5,845,306 A | 12/1998 | Schabes et al. | |
| 6,324,592 B1 | 11/2001 | Hindman | |
| 6,351,776 B1 * | 2/2002 | O'Brien et al. | ............. 709/245 |
| 6,564,241 B1 | 5/2003 | Rosengard | |
| 6,801,769 B1 | 10/2004 | Royalty | |
| 6,831,926 B1 | 12/2004 | Kinstler | |
| 6,894,505 B2 | 5/2005 | Gohel | |
| 7,149,612 B2 | 12/2006 | Stefani et al. | |
| 7,162,336 B2 | 1/2007 | Berthon et al. | |
| 7,165,123 B2 | 1/2007 | Hindman | |
| 2002/0188776 A1 | 12/2002 | Houlberg | |
| 2003/0158963 A1 | 8/2003 | Sturdy et al. | |
| 2003/0167345 A1* | 9/2003 | Knight et al. | ............... 709/249 |
| 2003/0187554 A1 | 10/2003 | Henry et al. | |
| 2004/0008253 A1 | 1/2004 | Monroe | |

(Continued)

FOREIGN PATENT DOCUMENTS

CN   1622520 A   6/2005

(Continued)

*Primary Examiner*—Mark Hellner
(74) *Attorney, Agent, or Firm*—Oliff & Berridge, PLC

(57) ABSTRACT

A system and method are provided for facilitating substantially seamless interface between individual component systems for sensor fusion, data exchange, and communication across a broad spectrum of component systems in a vehicle without implicating hardware or software upgrade within individual legacy systems and/or sensors. A universal translator is provided to interface between individual system components that exchange data in a seamless manner between legacy data formats and specific data formats advantageously employed by newly-developed, procured and installed individual component systems. One or more of an analog, digital or serial communications gateway network between one or more of vehicle control components and installed communication, navigation, surveillance and/or sensor sub-components and/or systems provides substantially seamless integration between such systems regardless of the individual data format and exchange capabilities to which the individual systems or sub-components may be designed.

13 Claims, 1 Drawing Sheet

U.S. PATENT DOCUMENTS

| | | |
|---|---|---|
| 2004/0176887 A1 | 9/2004 | Kent et al. |
| 2004/0180653 A1 | 9/2004 | Royalty |
| 2005/0086341 A1* | 4/2005 | Enga et al. .................. 709/224 |
| 2005/0232207 A1* | 10/2005 | Antoniadis et al. .......... 370/338 |
| 2006/0164261 A1 | 7/2006 | Stiffler |
| 2006/0174221 A1 | 8/2006 | Kinsella et al. |
| 2006/0200587 A1 | 9/2006 | Hindman |
| 2006/0212909 A1* | 9/2006 | Girard et al. ................. 725/73 |
| 2007/0027589 A1 | 2/2007 | Brinkley et al. |
| 2007/0298786 A1* | 12/2007 | Meyers et al. ............... 455/431 |

FOREIGN PATENT DOCUMENTS

| | | |
|---|---|---|
| DE | 10 2004 059 981 A1 | 6/2006 |
| EP | 0 807 888 A1 | 11/1997 |
| EP | 1 560 121 A1 | 8/2005 |

* cited by examiner

SYSTEMS AND METHODS FOR COMMUNICATION, NAVIGATION, SURVEILLANCE AND SENSOR SYSTEM INTEGRATION IN A VEHICLE

BACKGROUND

This disclosure is directed to systems and methods for implementing integration, and translation of data between varying communication, navigation, surveillance and sensor systems in a vehicle.

Recent years have seen tremendous technology advances in electronic communication, navigation, surveillance and sensor systems. Many of these systems are specifically designed to be vehicle mounted and integrated. As such, an ability to provide a vehicle with advanced communication, navigation, surveillance and/or sensor integration capabilities exists.

Vehicle manufacturers attempt to keep pace with the rate of technologic advance in the areas of communication, navigation, surveillance and sensor systems. Often, however, by the time the vehicle is produced, with such these systems installed, advances have been made in one or more of the above categories that may render one or more of the "factory-installed" systems less effective than an operator of the vehicle, who is aware of the latest capabilities, may desire. Providing then new vehicles with the latest suite of electronics is a challenge.

This challenge only increases in the area of what can broadly be considered "after-market" modification. Operators of older vehicles, not desiring to replace serviceable older vehicles, may desire to have those vehicles upgraded with some measure of advanced communication, navigation, surveillance and/or sensor systems based on the inclusion of one or more components of the latest available technology.

In new vehicles, at least the delivered systems are generally integrated in a manner by which the individual system components can exchange data and possibly share common data storage capabilities and certain of the functionalities. For older vehicles, the above-described modification scheme, on the other hand, tends to result in piecemeal replacement based on a number of factors, and a resultant non-integrated system. The factors may include the age of the vehicle and a capability of the vehicle and other legacy systems to support upgrade, based on numerous considerations. Another factor may be the individual resources that the operator has to dedicate to upgrade and modification and the operator's priorities for such upgrade or modification. Soon, what was once at least a limitedly integrated system has broken down through modification and upgrade of individual components into a collection of substantially stand-alone systems directed to specific capabilities and requiring virtually autonomous operation. This occurrence may be based, for example, from individual systems having optimized data handling characteristics and data protocols that are incompatible with other installed systems.

The above-described difficulties resulting from routine and on-going vehicle upgrade are nowhere more acute than in, for example, aerial vehicles, and particularly military, commercial and general aviation aircraft. It is generally impractical to replace older airframes, particularly because they still may have significant remaining service life, based on a desire to take advantage of newer integrated avionics systems, even when upgrades in other support systems external to the vehicle in the environment within which the vehicle is intended to be operated, may have rendered obsolete one or more of the legacy avionic systems installed in the vehicle.

The practical solution is to routinely upgrade particular airframes or groups of airframes with more advanced avionics systems for communication, navigation, surveillance, and/or sensor integration, as well as aircraft operation in the form of advanced mission computers and/or operational flight programs. Every upgrade decision will be based on a series of factors prioritized by the aircraft operator, or, in instances, mandated by governmental or industry directive or certification requirement. Factors that may affect the decision to upgrade include availability and physical compatibility of the newer components, as well as generally economically-based decisions balancing a desire for a specific capability against cost.

Because these individual component systems, and advances in such systems, are developed by differing entities and produced by differing manufacturers, many of whom desire that their individual products support integration of only others of their products, the individual component systems that a particular user may desire to include in upgrade of an individual vehicle, or group of vehicles, may be incompatible with each other. Generally, this incompatibility manifests itself in an inability of legacy systems to communicate, and exchange data, with the newer systems, based often on factors such as differing data exchange protocols.

A result of the combination of the above factors is that individual updated components may be installed in a vehicle, with an eye toward upgrading one or more of the communication, navigation, surveillance and/or sensor capabilities of the vehicle, but the individual newly-procured and installed component system may be incompatible with one or more of legacy systems that are not upgraded in a commensurate manner to be, for example, compatible with the newly-installed system. In reality then, the inclusion of the newly-installed component may actually decrease the effectiveness of the overall system within which the newly-installed component system is included.

This situation becomes more extensive when, over a period of time, many individual upgrades are undertaken such that the communication/navigation/surveillance/sensor system in a vehicle becomes a set of individual components limitedly linked together in a manner that may not take full advantage of the capabilities of any of the individually newly-installed, and perhaps significantly-upgraded, component capabilities.

A solution to the integration problem is to modify individual systems and/or their embedded software, or to require modification of other dependent systems and/or sub-systems to include single translational type devices at various stages in the intercommunications pathways, and/or data communications buses, that connect the individual components of the differing system and sub-systems. In specific instances, individual interface units may be provided in order to support translation and/or integration of certain of the capabilities of the newly-installed component with the legacy systems.

Owing to limitedly-modifiable hardware configurations, to the extent that translation and integration can be provided between individual system components and/or devices, it is unrealistic, particularly across, for example, a fleet of vehicles to create and maintain individually customized single purpose interaction devices in a cost-effective manner. A necessity to provide single-purpose interfaces necessarily increases cost and/or complexity of the overall system within which the newly-installed components are intended to be employed. Coincidentally, future upgrade potential is even more detrimentally affected.

As the tension increases between the rate of technology advance in individual component systems, and a need to prolong the usable service life of an individual vehicle, the answer is not to attempt to address each translational problem associated with an individual communication or data interface between non-compatible systems with a single purpose translator or integrator.

SUMMARY

Recognition of the problem, and the growing inadequacy of the above solution, has led to a marginal stepwise increase as a better solution is sought. Very narrowly implemented purpose-driven devices for providing data translational services between multiple system components have been introduced. Generally these systems provide only limited input/output (I/O) capabilities for the data and communication with other components systems. The translational relationships between those component systems remain specifically focused and generally custom designed to only a specific set of system components intended, or reasonably foreseen, to be connected. Such a solution represents little advantage over single link communication networks and/or pathways in that the devices that provide the interactive and translational connection must be specifically designed to a set of criteria based on the currently-installed, or planned-installed, component systems. Later upgrade of any one of the component systems will still be hampered in that it will require a decision to be made whether to forego such upgrade, or to have an interface system likewise upgraded, often through purpose and/or component driven redesign.

Simply put, due to a continual evolution of avionics systems, a single-point purpose or component driven solution that provides for integration of current systems likely provides a roadblock to efficient and effective future modifications, enhancements and upgrades, based on factors such as those discussed above, principally increased cost. Again with respect to aerial vehicles, another consideration becomes particularly acute when each upgraded system comes with some additional functioning unit to act as a limited integrator and/or translator. The potential for increasing space, weight and power (SWAP) detriments may strain already critical payload considerations in certain aircraft. All of this may come at a cost based on a likely impact on overall system reliability, at least in a form of being unable to exploit all of the capabilities of a newly-installed component based on an individual inability of such component to be able to effectively communicate and/or exchange data with the myriad other systems installed in the vehicle.

Imagine the situation where an individually newly-acquired and installed system with significantly increased individual capability impacts an overall system capability based on an inability to effectively communicate, exchange data and/or otherwise interact with other system components absent one or more specifically designed and commensurately installed single, or limited, purpose translation and/or integration devices.

Key concerns in maintaining and upgrading a communication/navigation/surveillance/sensor system in a vehicle with individual components of ever-increasing capability may reside in finding a simple and/or cost-effective manner by which communication and/or data exchange may be implemented between such individual systems without requiring other non-cost effective, limitedly reliable and/or SWAP detrimental upgrades to be made to the system concurrently with the installation of each new individual component.

In view of the above-identified shortfalls, and in light of the identified objectives, it would be advantageous to provide a system and method for substantially seamless interface between individual component systems to facilitate sensor fusion, data exchange, and communication across a broad spectrum of component systems without implicating hardware or software upgrade within individual legacy systems and/or sensors. In other words, it would be advantageous to provide a universal translator to provide such interface between individual system components that may exchange data in a seamless manner, e.g., provide one or more translation functions between legacy data formats and specific data formats advantageously employed by newly-developed, procured and installed individual component systems.

The systems and method according to this disclosure may provide a functionality, resident in a mission computer or otherwise, that facilitates data exchange between one or more component communication, navigation, surveillance and/or sensor systems in a vehicle.

In various exemplary embodiments, the systems and methods according to this disclosure may provide one or more of an analog, digital or serial communications gateway network between one or more of vehicle control components and installed communication, navigation, surveillance and/or sensor sub-components and/or systems in order to provide substantially seamless integration between such systems regardless of the individual data format and data exchange capabilities to which the individual systems or sub-components may be designed.

In various exemplary embodiments, the systems and methods according to this disclosure may provide devices and/or units that are, or can be, certified to one or more of military, and/or Federal Aviation Administration, and/or other U.S. or worldwide agency or industry certification requirements for providing a data translation/communication bridge between different component systems to alleviate a need for requiring hardware or software changes to, or specifically designed single purpose data interface exchange capabilities between, sub-system components that are intended to be most advantageously interfaced.

In various exemplary embodiments, the systems and methods according to this disclosure may provide a universally adaptable integration and communication platform to provide a fused data environment based on integration and translation of individual data resource requirements of, and seamless communication with, multiple component sub-systems.

The systems and methods according to this disclosure may provide substantially seamless integration between communication, navigation, surveillance and sensor component subsystems that support communication, navigation and surveillance requirements, and air traffic control management and integration for individual aircraft and/or groups and/or classes of aircraft operated under restrictions imposed locally, within the boundaries of U.S. airspace, or worldwide.

In various exemplary embodiments, the systems and methods according to this disclosure may include a capability to integrate input/output requirements across a broad base of specifically aircraft and aviation defined individual data protocols to include, but not limited to, MIL-STD-1553, RS-232, RS-422, RS-485, ARINC 429, Ethernet, Discrete, Synchro and Analog data exchange requirements.

The systems and methods according to this disclosure may provide a data translation/communications bridge for sensor fusion between two or more systems, particularly those which could not previously communicate with each other without specific modification of one or more of the individual component systems, or through employment of multiple single-purpose translation devices inserted at each stage of a system communication pathway integrated between individual system components.

These and other features and advantages of the disclosed systems and methods are described in, or apparent from, the following detailed description of various exemplary embodiments.

BRIEF DESCRIPTION OF THE DRAWINGS

Various exemplary embodiments of disclosed systems and methods will be described, in detail, with reference to the following figure, wherein.

DETAILED DESCRIPTION OF EMBODIMENTS

Figure 1:
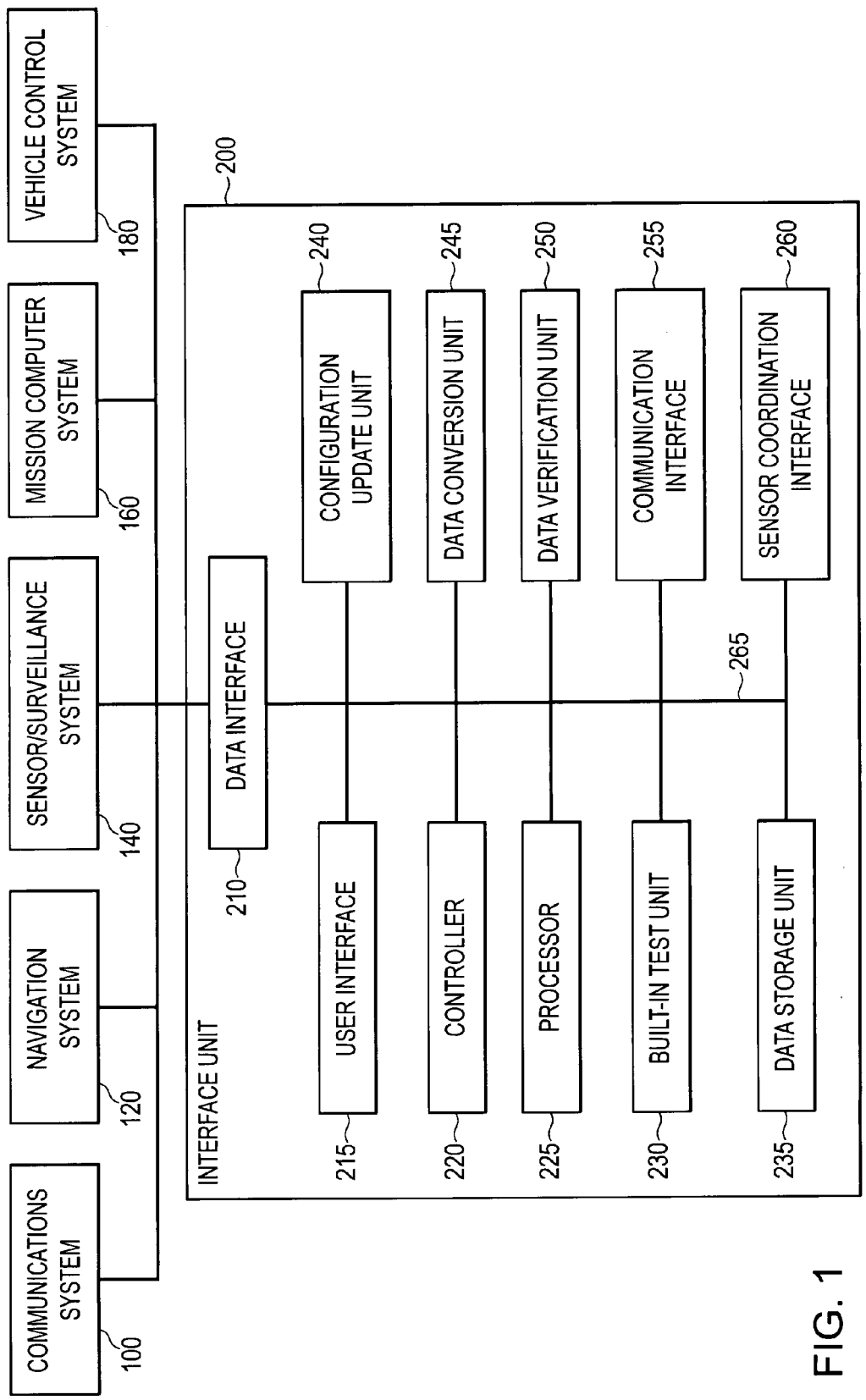
FIG. 1 illustrates a block diagram of an exemplary embodiment of a system for effecting seamless communication and/or integration between multiple component sub-systems according to this disclosure.

The following description of various exemplary embodiments of disclosed systems and methods will describe an exemplary system for integrating and/or translating different data communication capabilities for individual communication, navigation, surveillance, and/or sensor integration, and vehicle control functionalities, and perhaps protocols, between individual component systems in a vehicle. Specific reference may be made to avionics component integration in aerial platforms, particularly military, commercial, and general aviation aircraft. This exemplary objective and application are discussed because these are areas where the preservation of legacy platforms and a need to upgrade electronics capabilities make the need for systems and methods according to this disclosure particularly acute. This is because, based on a need to preserve individual vehicle platform service life, and a desire to provide the latest technologies, such vehicles are particularly susceptible to incremental upgrade of installed electronic components, highlighting a particular system architecture within which the systems and methods according to this disclosure may prove particularly advantageous. Such specific description of an exemplary employment of exemplary systems and methods according to this disclosure is provided for clarity, understanding, and ease of depiction and/or description. It should be appreciated, however, that the system and methods, as disclosed and described in exemplary embodiment below, are not meant to be limited to any specific embodiment or exemplary application. In other words, disclosed systems and methods are intended to be implementable to provide individual component integration between vehicle sub-systems designed to a specific purpose, and around a specific data protocol, to enhance communication, navigation, surveillance, and/or sensor integration, and vehicle control in a substantially seamless manner, and to provide a capability whereby individual component systems may be removed, replaced and principally upgraded, without a need to modify any existing, legacy, or otherwise limitedly-replaceable components within the vehicle.

In various exemplary embodiments, the system and methods according to this disclosure may provide a single onboard interface unit that may be capable of one or more of the following:

translating individual data protocols between individual communication, navigation, sensor fusion, surveillance and vehicle control capabilities in order to enhance an individual upgrade capability that provides for substantially seamless integration of new-technology component systems without modification of any legacy systems installed in the vehicle;

translating data protocols to be compatible with off-board systems, with an internal capability to exchange data with such off-board systems via one or more data exchange and/or communication means; and being individually modifiable and/or upgradeable to maintain an effective bridging capability between individual system components even as those individual system components are upgraded, modified or replaced over an extended life cycle of an individual vehicle.

It should be understood that, for the purposes of this disclosure, the term vehicle should not be narrowly construed to refer to any particular type of vehicle. As indicated above, aircraft installations are contemplated for the systems and methods according to this disclosure. The term vehicle, however, as discussed in this disclosure, although sometimes modified by terms such as "aerial" or "surface," should not be construed to be limited to any specific type of vehicle or conveyance, or movement in any specific environment. Virtually any airborne, surface (land or sea) or sub-surface vehicle, generally powered, as the term "vehicle" may be most broadly considered, is contemplated to be able to incorporate a device according to the disclosed systems and methods. Once such a device is installed, or otherwise carried, in a vehicle, incorporation of other component sub-systems to enhance communication, navigation, sensor fusion, surveillance capabilities and/or vehicle control are anticipated to be individually replaceable with minimal impact to related component sub-systems, except as some, for example, data or other software upgrade may be incorporated into an integrating unit according to the systems and methods of this disclosure. It is envisioned that an appropriately-structured device may even be man-portable to enhance one or more of the above-discussed capabilities that may be supported by man-portable component sub-systems as well.

FIG. 1 illustrates a block diagram of an exemplary embodiment of a system for effecting seamless communication and/or integration between multiple component sub-systems according to this disclosure. As shown in FIG. 1, an interface unit 200 may be provided to coordinate, integrate and/or universally translate data exchange and operational interaction between individual systems and/or sub-systems in a vehicle. Such systems may include a communication system 100, a navigation system 120, a sensor/surveillance system 140, a mission computer system 160 and a vehicle control system 180. It should be appreciated that this is not intended to be an exhaustive list of the systems for which an interface unit 200 may be provided to integrate, coordinate and/or translate data exchange between.

As further shown in FIG. 1, an interface unit 200 may include at least one data interface 210, a user interface 215, a controller 220, a processor 225, a built-in test unit 230, one or more data storage units 235, a configuration update unit 240, a data conversion unit 245, a data verification unit 250, one or more communication interfaces 255, and one or more sensor coordination interfaces 260 all connected, and/or in data exchange communication with one another, via a data/control bus 265.

It should be appreciated that, although depicted as separate individual elements, any one or more of the depicted individual units and/or devices may be combinable with other individual units and/or devices as combined units and/or devices within the disclosed interface unit 200. Further, while envisioned as a hard-wired data/control bus 265, any data communication path by which data and control inputs may be exchanged between individual units and/or devices, and/or combination units and/or devices, within the exemplary interface unit 200, or otherwise, is envisioned. In fact, one or more of the depicted individual units and/or devices may not be housed within, for example, an individual enclosure comprising the interface unit 200, but rather may be in data communication with such interface unit 200 via any manner of wired and/or wireless means. Individual data communication paths, as discussed in this disclosure, may include individual wired, wireless, optical and/or other known types of communication connections, or any combination of such connections, between individual communicating elements by which data may be understood to be exchanged. Additionally, it should be appreciated that like combinations of communication capabilities may exist between each of the depicted vehicle systems 100-180 and the exemplary interface unit 200. Each system will be described in greater detail below.

In various exemplary embodiments, the interface unit 200, as a unit or combination of individual devices, units, and/or functionalities, may be configured in a manner to support certification according to applicable standards. Such standards may include, but are not limited to, one or more of MIL-STD-810, MIL-STD-461/464, MIL-STD-704F, and/or MIL-E-5400T, for example, when intended to be installed in an aircraft for Class 1A operations.

It is envisioned that the interface unit 200 may comprise and/or combine one or more specifically suited, and individually or collectively ruggedized, commercial off-the-shelf (COTs) components with customized interfaces to provide a lightweight, cost-effective all-source reconfigurable translator and system integrator. It is further envisioned that such an interface unit 200 may find particular application as an interface between avionics units in military, commercial, or general aviation aircraft.

It should be appreciated that although the interface unit 200 will be described as a separate unit including specific capabilities and/or functionalities, such a unit may be internal to, for example, one or more mission computers comprising a mission computer system 160 that may include other operational programming for vehicle control and system integration. Such a mission computer system 160 included, for example, in an aircraft, is recognized as storing and executing operational flight programs for the aircraft.

An objective of the interface unit 200 is to provide targeted fused data to integrate the capabilities of the vehicle control and other related systems in a manner that is updatable based on upgrade, modification, or replacement of any one or more components of a communication/navigation/sensor/surveillance/vehicle control system in a vehicle. As was indicated above, it is envisioned that such an interface unit 200 may be suitable for operations in aerial vehicles, such as, for example, military, commercial and general aviation aircraft; shipboard and/or submarine operations; and/or any one or more of myriad ground-based vehicle applications. Additionally, a man-portable version of the interface unit 200, to be compatible with one or more man-carried sensor, navigation and/or communication systems, is also contemplated.

It should be appreciated that when presented as a separate interface unit 200, in various exemplary embodiments the interface unit 200 is anticipated to be configured to meet strict size, weight and power (SWAP) restrictions that may be applicable to the particular vehicle for which the interface unit 200 is adapted. These considerations are particularly acute with regard to, for example, inclusion of such an interface unit 200 in unmanned aerial vehicles and/or when employed as man-carried units. In this regard, the interface unit 200 may be packaged in an enclosure of an approximate size of 12 inches in length by 5 inches in width by 5 inches in depth, and weighing 10 pounds or less. In exemplary embodiments the power source for the interface unit 200 may be standard 28 volt DC at 400 milliamps, but other power sources, whether provided by the vehicle, or provided autonomously to the interface unit 200, are contemplated.

In various exemplary embodiments, a data interface 210 may be provided as one or more available input/output ports to facilitate communication with one or more of the vehicle systems 100-180 via available connection means, including wired or wireless means. When the data interface is connected for wired communications, such data interface 210 may comprise one or more ports according to MIL-STD-1553, RS-232, RS-422, RS-485, ARINC 429, Ethernet, Discrete and/or Analog I/O ports. Any manner by which compatible data interaction may be facilitated between one or more of the vehicle systems 100-180 and the interface unit 200 via such data interface 210 is contemplated.

In various exemplary embodiments, a user interface 215, when included, may afford a user an opportunity to directly communicate with the interface unit 200, or to communicate with one or more of the vehicle systems 100-180 via the interface unit 200. Also, the interface unit 200 may provide a means for a user, via a user input 215 or otherwise, to communicate externally from the vehicle through interface with the vehicle communication system 100 or via a separate communication interface 255 associated with the interface unit 200.

In various exemplary embodiments, the interface unit 200 may receive, and/or coordinate, any manner of communication inputs from one or more individual communicating units and/or transmitter/receiver units which may comprise the vehicle communications system 100. Such individual communication components within the vehicle communications system 100 may include, but are not limited to, RF transceivers, SATCOM transceivers, cellular communication links, and/or other related, or like, communication devices comprising the vehicle communications system 100.

The interface unit 200 may receive input from, and provide input to a vehicle navigation system 120. Such navigation system 120 may include, for example, a capability to receive and process position information generated from a global positioning satellite (GPS) system, and/or a capability to generate vehicle position keeping via some internal inertial navigation system initialized to a known position. Communication between the navigation system 120 and the interface unit 200 may include processed or unprocessed position keeping data which, in the case of unprocessed data may be processed within the interface unit 200 and translated to a data output compatible with the other vehicle systems.

The interface unit 200 may receive sensor input from one or more sensors comprising a sensor/surveillance system 140 of the vehicle. Such sensor input may be provided to the interface unit via one or more communication means which may include the data interface 210, or separately sensor input may be provided from the sensor/surveillance system 140, or from individual sensors located throughout the vehicle, directly to the interface unit 200 via some manner of sensor coordination interface 260. Exemplary sensors included in the sensor/surveillance system 140 of the vehicle, or located throughout the vehicle and associated with the vehicle, and communicating directly with the interface unit 200 by the sensor coordination interface 260 may include, but are not limited to, for example, radiation sensors, RF sensors, visual sensors, motion sensors, IR sensors, chemical/biological/radiological hazard sensors or any other like sensor array. The individual sensors, whether comprising a sensor/surveillance system 140, or communicating individually directly with the interface unit 200 may be provided to detect, for example, information germane to operation of the vehicle, environmental conditions, specific characteristics of a target object which may affect, or be affected by, vehicle operations (to include, for example, target object position, composition and/or risk of collision), or characteristics regarding a geographic reference point exhibiting some sensor measurable characteristic that is of interest to an operator of the vehicle. Although described, in exemplary manner, with regard to individual sensors, and/or sensor capabilities and/or functions above, it should be appreciated that this list is by no means exhaustive and sensor inputs to the interface unit 200 from, for example, a sensor/surveillance system 140, or directly via a sensor coordination interface 260 from individual sensors, are not intended to be limited to any specific application that may be construed based on the above list.

In various exemplary embodiments, one or both of a controller 220 and/or a processor 225 may be provided to coordinate the individual functions of the interface unit 200. Such control and/or processing may include coordination of data or other inputs received via one or more of the data interfaces 210, a user interface 215, a communication interface 255 and/or a sensor coordination interface 260. In addition, the processor 225 may provide computational tasks such as mathematic and algorithmic processing for the purpose of controlling or directing external vehicle systems as a mission computer. As such, all processing and control of the functionalities of the interface unit 200 may be coordinated by such individual control and processing units 220, 225.

The interface unit 200 may also include an autonomous communication interfacing capability via a communication interface 255. Such communication interface 255 may be employed to receive input from, and transmit output to, or via, the communications system 100. Alternatively, data communications as may be appropriate to be output from the interface unit 200 directly via communication interface with other vehicle systems, or directly from or to the vehicle may be provided via the communication interface 255.

The interface unit 200 may comprise a built-in test unit 230 usable to periodically, routinely, or on-call run system diagnostics on the interface unit 200, and any device unit or system that may be in communication with the interface unit 200. Such built-in test capability may be particularly appropriate when a configuration of any individual vehicle system 100-180 is updated and update of configuration control for the vehicle system may be undertaken by a configuration update unit 240 of the interface unit 200. Functionality of the configuration update unit 240 will be described in greater detail below.

One or more data storage units 235 may be provided to store any manner of system data or system coordination data for operation of the interface unit 200 and/or for coordination with one or more of the vehicle systems 100-180. Such data storage unit may operate in coordination, for example, with the mission computer system 160 and/or the vehicle control system 180, either of which may individually store, update and/or exercise operational programming for coordination of vehicle movement, sensor integration, communication and/or navigation. When installed in aircraft, such operational coordination is understood to be executed through one or more operational flight programs (OFPs) which may be resident in a mission computer system 160, and by direct integration with the vehicle control system 180. While depicted as separate vehicle control systems, it should be understood that these devices, units and/or functions are not meant to be necessarily exclusive of one another. For ease of depiction, and description, however, the individual vehicle systems are depicted regarding potential specific functional capability.

It should be appreciated that the controller 220, processor 225 and one or more data storage units 235 of the interface unit 200 may provide sufficient data storage and control processing capacity to facilitate the inclusion of additional functionalities beyond which are specifically described as being implemented by the interface unit 200 itself. Software applications to facilitate, for example, such enhanced functionalities may be pre-stored, or communicated to the interface unit via the data interface 210, the user interface 215, or, for example, the configuration update unit 240.

In various exemplary embodiments, the interface unit 200 is provided with a capability to update a configuration of the interface unit 200 itself, or to be provided with information on updates, upgrades, or modifications to, as well as replacement of, any one of the vehicle systems 100-180, or individual components in, or associated with such systems, via, for example, a configuration update unit 240. It is envisioned that compatible software to update the capability by which the interface unit 200 may continue to provide a seamless integration and translation capability between individual vehicle systems 100-180 may be provided through such a configuration update unit 240 and may be stored, for example, in a data storage unit 235, or input via one or more of the interfaces or in communication directly from the affected vehicle system.

An objective of the systems and methods according to this disclosure, and the exemplary interface 200 shown in FIG. 1, implementable, for example, via a configuration update unit 240, is to provide for seamless integration of the multiple vehicle systems 100-180, and to provide simple streamlined support capability for modifying an integration scheme between such systems when one or more of the systems and/or component devices within those systems is updated, upgraded, modified, removed or replaced, or other such action is taken as may adversely effect an overall communication/navigation/sensor/surveillance/control system of a specific vehicle absent such an integrator. In this regard, any manner by which updating software and/or circuitry may need to be incorporated within the overall system is envisioned to be housed within, or provided for, with the exemplary interface unit 200. Such an interface unit 200 is envisioned to encompass the single point source within the overall integrated vehicle system to manage configuration of the vehicle system and to be updatable to continue to provide such capability regardless of changes in individual components and/or individual system within the integrated vehicle system.

In various exemplary embodiments one or both of a data conversion unit 245 and a data verification unit 250 may be provided to receive data input from one or more of the vehicle systems 100-180 via, for example, a data interface 210, and may convert that data as appropriate under control of the controller 220 and/or the processor 225, and based possibly on information stored in the data storage unit 235, to make data input from any one of the individual vehicle systems 100-180 compatible for output to, and use by, one or more of the other vehicle systems 100-180. Such data conversion may be continuously updated based on information provided via a configuration update unit 240 and stored in a data storage unit 235 such that individual components may be upgraded without degrading an integration capability of the overall vehicle system of systems simply by ensuring that the interface unit 200 is provided with data and programming necessary to maintain the translating and integrating function of the integrating unit 200 as individual components within individual vehicle systems, or a system architecture of the vehicle in total, are modified. Conventional means by which data may be translated between individual, differing, and potentially non-compatible formats is envisioned to be included within one or more of the data conversion unit 245 and/or the data verification unit 250 of the interface unit 200.

Resident within the interface unit 200 in, for example, a data conversion unit 245, may be a capability to know the multiple data formats that may be required to keep the system integrated. As such, when data is received discretely, or on a continuous basis, from each of the individual vehicle systems 100-180, the data conversion unit 245 may be available to individually translate the data to be usable by each of the other individual vehicle systems 100-180, or may establish a common data format to be shared among the individual vehicle systems 100-180. As may be appropriate, a data verification unit 250 may be separately provided to monitor the data conversion occurring in the data conversion unit 245 in order to attempt to ensure that seamless integration occurs, and to reduce and/or substantially eliminate errors due to, for example, data corruption.

Any data storage contemplated for exemplary embodiments of the disclosed interface unit 200 may be implemented using any appropriate combination of alterable memory or fixed memory. The alterable memory, whether volatile or non-volatile, may be implemented using any one or more of static or dynamic RAM, compatible disk drives with associated disk type media, hard drives, flash memories, or other like memory media and/or devices. Similarly, text memory can be implemented using one or more of ROM, PROM, EPROM, EEPROM, or compatible internal disk drive, or any other like memory storage media and/or devices.

It should be appreciated that given the required inputs the processing outline above, particularly for integrating and/or translating data to be compatible between individual vehicle systems, may be implemented in the interface unit 200 through software algorithms, hardware or firmware circuits, or any combination of software, hardware and/or firmware control and processing elements. This is particularly relevant regarding implementation of the integration, potential data conversion and data verification (translation) functionalities that far intended to be implemented by the interface unit 200.

While exemplary embodiments have been described above for the disclosed device, the exemplary embodiments, and variations thereof should be viewed as illustrative, and not limiting. Various modifications, substitutes, or the like are possible to implement the systems and methods according to this disclosure for, for example, integration and translation of data services between individual component systems installed in a vehicle as those individual component systems are updated and/or modified with new units and/or capability.

What is claimed is:

1. An integration device for a vehicle, comprising:
    at least one data interface for exchanging data with a navigation system and at least one of a communication system, a sensor, a surveillance system or a control system of a vehicle;
    a data conversion unit in data communication with the at least one data interface for converting data received from the navigation system and at least one of the communication system, the sensor, the surveillance system or the control system of the vehicle to be compatible with data used by at least another of the communication system, the sensor, the surveillance system or the control system of the vehicle; and
    a configuration update unit communicating with the data conversion device,
    wherein when any component of the navigation system and at least one of the communication system, the sensor, the surveillance system or the control system of the vehicle with which the at least one data interface is exchanging data is physically changed, the configuration update unit updates the data conversion unit such that the data conversion is substantially unaffected by the change.

2. The device of claim 1, wherein the at least one data interface, the data conversion unit and the configuration update unit are all housed in a single enclosure with no linear dimension (height, width or length) greater than 12 inches, two of the three linear dimensions are less than 6 inches, and a weight of less than 10 pounds.

3. The device of claim 1, wherein the at least one data interface comprises one or more input/output ports according to at least one of MJL-STD-1553, RS-232, RS-422, RS-485, AIRING 429, Ethernet, Discrete or Analog.

4. The device of claim 1, further comprising a data verification unit for verifying at least one of the integrity and compatibility of data with an intended receiving system after the data conversion.

5. The device of claim 1, further comprising a user interface that allows a user to communicate directly with the device.

6. The device of claim 1, further comprising a data storage unit for storing configuration information regarding individual systems to be referenced by the configuration update unit.

7. The device of claim 1, further comprising a built-in test unit for running system diagnostics on at least one of the interface device or the at least one of the communication system, the navigation system, the sensor, the surveillance system or the control system of the vehicle with which the at least one data interface is exchanging data.

8. The device of claim 1, wherein the vehicle is an aerial vehicle and the at least one of the communication system, the navigation system, the sensor, the surveillance system or the control system of the vehicle with which the at least one data interface is exchanging data is an avionics unit.

9. The device of claim 8, wherein the device is configured to be qualified according to MJL-STD-810 and MJL-STD-461/464, and designed to MIIL-STD-704F and MIL-E-5400T standards for Class 1A aviation operations.

10. The device of claim 8, wherein the at least one of the communication system, the navigation system, the sensor, the surveillance system or the control system of the vehicle with which the at least one data interface is exchanging data includes at least the vehicle control system.

11. The device of claim 10, wherein the vehicle control system comprises at least one computer executing an operation flight program.

12. The device of claim 1, wherein the device can be carried by a user.

13. A method for integrating data exchange among a plurality of systems in a vehicle, comprising:
    exchanging data between a navigation system and at least one of a communication system, a sensor, a surveillance system or a control system of a vehicle via an interface unit;
    converting data received from the navigation system and at least one of the communication system, the sensor, the surveillance system or the control system of the vehicle to be compatible with data used by at least another of the communication system, the sensor, the surveillance system or the control system of the vehicle in the interface unit; and updating a configuration of the interface unit when any component of the navigation system and at least one of the communication system, the sensor, the surveillance system or the control system of the vehicle is physically changed such that the data conversion is substantially unaffected by the change, wherein, based on the change, individual modification of any of the other installed systems is not required to facilitate data exchange.

* * * * *